United States Patent
Kimura et al.

(10) Patent No.: US 10,465,524 B2
(45) Date of Patent: Nov. 5, 2019

(54) TURBINE BLADE

(71) Applicant: Mitsubishi Hitachi Power Systems, Ltd., Nishi-ku, Yokohama (JP)

(72) Inventors: Yasunori Kimura, Yokohama (JP); Shinichi Higuchi, Yokohama (JP); Ichiro Miyoshi, Yokohama (JP); Takuya Takeda, Yokohama (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 290 days.

(21) Appl. No.: 15/417,277

(22) Filed: Jan. 27, 2017

(65) Prior Publication Data

US 2017/0248020 A1    Aug. 31, 2017

(30) Foreign Application Priority Data

Feb. 26, 2016   (JP) .................................. 2016-036284

(51) Int. Cl.
  *F01D 5/18* (2006.01)
  *F01D 5/28* (2006.01)

(52) U.S. Cl.
  CPC ............. *F01D 5/186* (2013.01); *F01D 5/187* (2013.01); *F01D 5/288* (2013.01);
  (Continued)

(58) Field of Classification Search
  CPC .......... F01D 5/186; F01D 5/187; F01D 5/288; F05D 2230/90; F05D 2240/304;
  (Continued)

(56) References Cited

U.S. PATENT DOCUMENTS 4,028,787 A * 6/1977 Cretella ............... B23K 10/027
                                                29/889.1
4,050,133 A   9/1977 Cretella et al.
(Continued)

FOREIGN PATENT DOCUMENTS

CN   104234756 A   12/2014
JP   52-155141    12/1977
(Continued)

OTHER PUBLICATIONS

Extended European Search Report issued in counterpart European Application No. 17153735.0 dated Jun. 30, 2017 (6 pages).
(Continued)

*Primary Examiner* — Aaron R Eastman
(74) *Attorney, Agent, or Firm* — Crowell & Moring LLP

(57) ABSTRACT

A turbine blade includes cooling passages formed inside the blade and extending in a blade height direction, blade surfaces on a suction side and a pressure side being covered with thermal barrier coating, a design point on a suction side being set on the blade surface on the suction side of each blade section perpendicular to the blade height direction within a range from a position on a back side of and including a throat position, and to a position in front of and not including a tailing end of a final cooling passage. Thickness distribution of the thermal barrier coating on the suction side of each blade section is configured such that a thickness of the thermal barrier coating is uniform from a blade leading edge to the design point and gradually reduces from the design point toward the back side up to the blade trailing edge.

4 Claims, 6 Drawing Sheets

(52) U.S. Cl.
CPC .... *F05D 2230/90* (2013.01); *F05D 2240/304* (2013.01); *F05D 2240/306* (2013.01); *F05D 2260/202* (2013.01); *Y02T 50/673* (2013.01); *Y02T 50/676* (2013.01); *Y02T 50/6765* (2018.05)

(58) Field of Classification Search
CPC ......... F05D 2240/306; F05D 2260/202; Y02T 50/6765; Y02T 50/673; Y02T 50/676
USPC ...................................................... 416/97 R
See application file for complete search history.

(56) References Cited

U.S. PATENT DOCUMENTS

| | | | |
|---|---|---|---|
| 4,121,894 A | 10/1978 | Cretella et al. | |
| 5,621,968 A * | 4/1997 | Kikkawa | C23C 4/00 29/889.7 |
| 5,626,462 A * | 5/1997 | Jackson | C22C 32/00 416/229 A |
| 6,197,424 B1 | 3/2001 | Morrison et al. | |
| 7,491,033 B2 | 2/2009 | Trishkin et al. | |
| 8,070,454 B1 * | 12/2011 | Rawlings | F01D 5/288 416/228 |
| 8,123,481 B1 * | 2/2012 | Liang | F01D 5/185 416/97 R |
| 2002/0119045 A1 * | 8/2002 | Starkweather | F01D 5/187 416/97 R |
| 2003/0223861 A1 * | 12/2003 | Morrison | F01D 5/189 415/115 |
| 2006/0275118 A1 * | 12/2006 | Lee | F01D 5/188 416/97 R |
| 2007/0148003 A1 * | 6/2007 | Trishkin | F01D 5/18 416/241 R |
| 2008/0085191 A1 | 4/2008 | Liang | |
| 2008/0203236 A1 | 8/2008 | Mazzola et al. | |
| 2012/0114912 A1 | 5/2012 | Bunker et al. | |
| 2012/0148769 A1 | 6/2012 | Bunker et al. | |
| 2013/0058787 A1 * | 3/2013 | Batt | F01D 5/288 416/95 |
| 2013/0121839 A1 | 5/2013 | Batt et al. | |
| 2014/0083639 A1 | 3/2014 | Bonini et al. | |
| 2015/0369060 A1 * | 12/2015 | Levine | F01D 5/187 415/115 |

FOREIGN PATENT DOCUMENTS

| | | |
|---|---|---|
| JP | 57-2406 | 1/1982 |
| JP | 6-10608 A | 1/1994 |
| JP | 2010-506086 A | 2/2010 |
| JP | 2012-102736 A | 5/2012 |
| JP | 2012-127000 A | 7/2012 |
| JP | 2013-194667 A | 9/2013 |
| RU | 2 554 737 C2 | 6/2015 |

OTHER PUBLICATIONS

Chinese-language Office Action issued in counterpart Chinese Application No. 201710056727.5 dated Aug. 2, 2018 (13 pages).
Russian-language Office Action issued in counterpart Russian Application No. 2017105469/06 dated Apr. 4, 2018 (eight (8) pages).
Korean-language Office Action issued in counterpart Korean Application No. 10-2017-0010923 dated Jan. 19, 2018 (5 pages).
Japanese-language Office Action issued in counterpart Chinese Application No. 2016-036284 dated Apr. 2, 2019 (three (3) pages).

* cited by examiner

TURBINE BLADE

BACKGROUND OF THE INVENTION

Field of the Invention

The present invention relates to a turbine blade that includes at least one cooling passage formed in the blade so as to extend in a blade height direction and that has blade surfaces covered with thermal barrier coating.

Background Art

A gas turbine is a kind of rotary machine and has been used for a power source mainly for propulsion of an aircraft or power generation. A gas turbine is provided with a compressor, a combustor, and a turbine. The compressor draws in and compresses air and generates compressed air. The combustor combusts fuel with the compressed air generated by the compressor and generates high-temperature combustion gas. The turbine is rotated by the combustion gas (mainstream gas) generated by the combustor.

For an improvement in performances of a gas turbine, there is a requirement for increasing the temperature of the combustion gas. However, a problem (specifically, creeping, thinning due to oxidation, or the like) in which an increase in temperature of the combustion gas causes damage to a turbine blade (that is, a stator blade or a rotor blade) easily occurs. As a countermeasure for this problem, there is a method of forming a cooling passage inside the turbine blade and causing cooling air to flow through the cooling passage. There is also a method of covering a blade surface (that is, a surface of a blade material) with thermal barrier coating.

Although an increase in the thickness of the thermal barrier coating brings about a stronger effect of thermally shielding the blade surface from the high-temperature mainstream gas, an aerodynamic performance of the turbine blade deteriorates. Thus, the thickness of the thermal barrier coating at a blade trailing edge gradually reduces toward aback side according to JP-A-2013-194667. In doing so, the blade trailing edge width reduces and thus improves the aerodynamic performance.

Detailed description will be given of JP-A-2013-194667. According to JP-A-2013-194667, a design point on a suction side is set at a position of a tailing end of a final cooling passage, which is the closest to a blade trailing edge in at least one cooling passage extending in a blade height direction (specifically, at a position through which a straight line that passes through the tailing end of the final cooling passage and is perpendicular to a camber line passes through the blade surface on the suction side), on the blade surface on the suction side in each blade section perpendicular to the blade height direction. In addition, a thickness distribution of the thermal barrier coating on the suction side of each blade section is configured such that the thickness of the thermal barrier coating is uniform from a blade leading edge to the design point on the suction side and gradually reduces from the design point on the suction side toward the backside up to the blade trailing edge.

Similarly, a design point on a pressure side is set at a position of the tailing end of the final cooling passage (specifically, at a position through which the straight line that passes through the tailing end of the final cooling passage and is perpendicular to the camber line passes through a blade surface on the pressure side) on the blade surface on the pressure side in each blade section perpendicular to the blade height direction. In addition, the thickness distribution of the thermal barrier coating on the pressure side of each blade section is configured such that the thickness of the thermal barrier coating is uniform from the blade leading edge to the design point on the pressure side and gradually reduces from the design point on the pressure side toward the back side up to the blade trailing edge.

SUMMARY OF THE INVENTION

The following problem is present in the aforementioned related art. That is, according to JP-A-2013-194667, the design point on the suction side is set at the position of the tailing end of the final cooling passage, and the region where the thickness of the thermal barrier coating on the suction side gradually reduces is relatively small. Therefore, a deceleration gradient of fluid flowing along the thermal barrier coating on the suction side locally increases, and a boundary layer easily grows. Therefore, a loss of aerodynamic force increases.

An object of the invention is to provide a turbine blade capable of alleviating the deceleration gradient of the fluid flowing along the thermal barrier coating on the suction side, suppressing the growth of the boundary layer, and suppressing the loss of the aerodynamic force.

In order to achieve the aforementioned object, the invention provides a turbine blade including: at least one cooling passage that is formed in the blade and extends in a blade height direction, in which blade surfaces on a suction side and a pressure side are covered with thermal barrier coating, a design point on the suction side is set on the blade surface on the suction side in each blade section perpendicular to the blade height direction within a range from a position on a back side of and including a throat position, at which a distance between turbine blades is the global minimum, to a position in front of and not including a position of a tailing end of a final cooling passage that is the closest to a blade trailing edge in the at least one cooling passage, and thickness distribution of the thermal barrier coating on the suction side of each blade section is configured such that a thickness of the thermal barrier coating is uniform from a blade leading edge to the design point and gradually reduces from the design point toward the back side up to the blade trailing edge.

In the invention, the thickness distribution of the thermal barrier coating on the back side of each blade section is configured such that the thickness of the thermal barrier coating is uniform from the blade leading edge to the design point and gradually reduces from the design point toward the back side up to the blade trailing edge in the same manner as in JP-A-2013-194667. However, the design point on the suction side is set on a further forward side and the region where the thickness of the thermal barrier coating on the suction side gradually reduces is enlarged as compared with the configuration in JP-A-2013-194667. In doing so, it is possible to alleviate the deceleration gradient of the fluid flowing along the thermal barrier coating on the suction side and to suppress the growth of the boundary layer. Therefore, it is possible to suppress the loss of aerodynamic force.

According to the invention, it is possible to alleviate deceleration gradient of fluid flowing along the thermal barrier coating on the suction side, to suppress growth of the boundary layer, and to suppress a loss of aerodynamic force.

DETAILED DESCRIPTION OF THE INVENTION

Description will be given of a first embodiment of the invention with reference to drawings.

Figure 1:
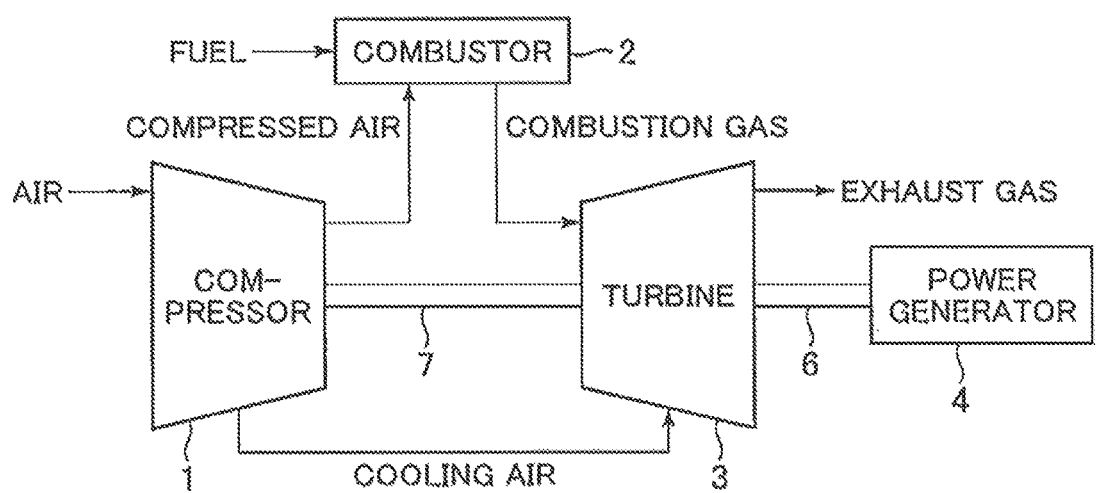
FIG. 1 is an outline diagram illustrating a configuration of a gas turbine for power generation to which the invention is applied.
Figure 2:
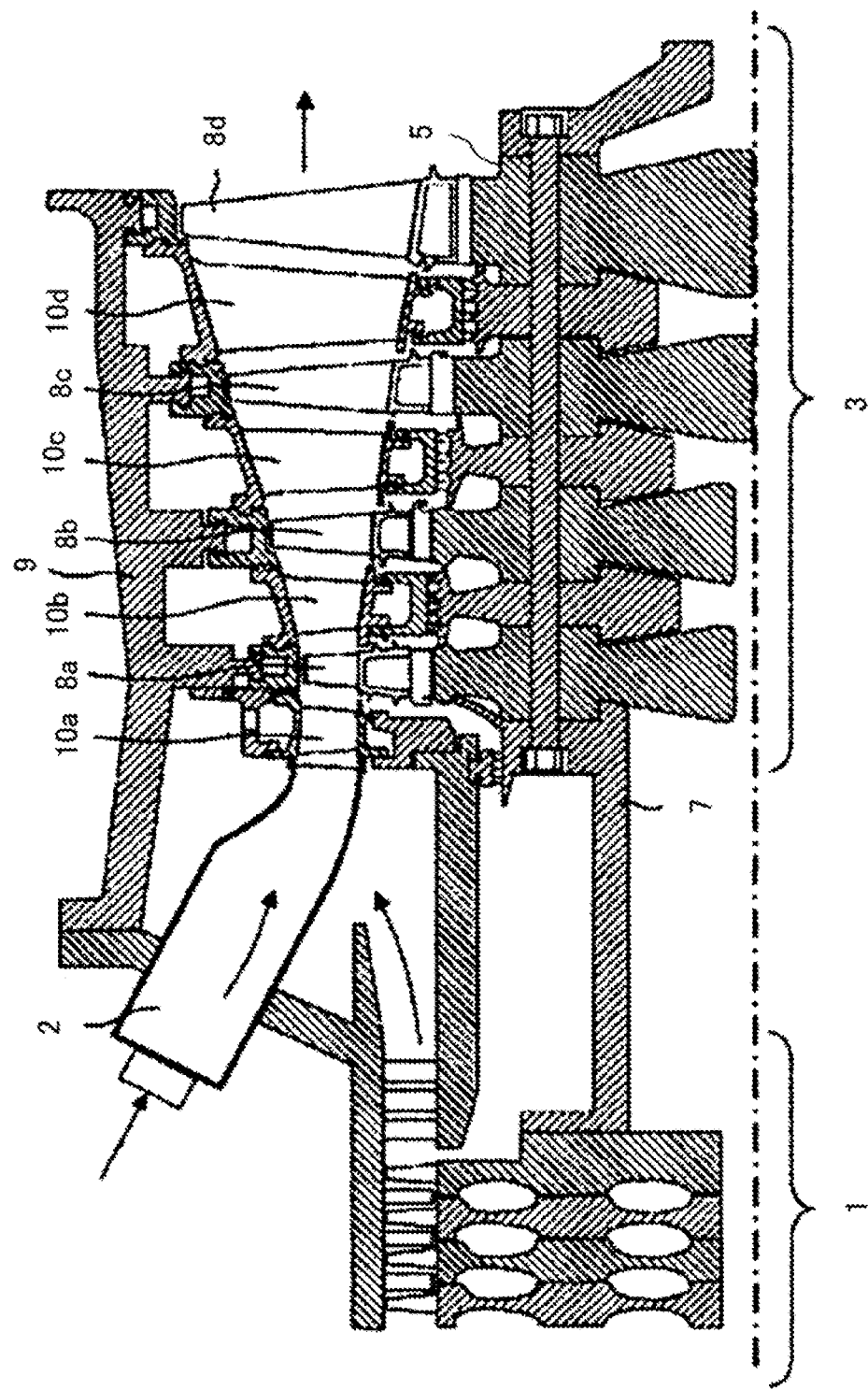
FIG. 2 is a sectional view illustrating a structure of the gas turbine to which the invention is applied.

FIG. 1 is an outline diagram illustrating a configuration of a gas turbine for power generation to which the invention is applied, and FIG. 2 is a sectional view illustrating a structure of the gas turbine.

The gas turbine is provided with a compressor 1, a combustor 2, a turbine 3, and a power generator 4. The compressor 1 draws in and compresses air and generates compressed air. The combustor 2 combusts fuel along with the compressed air generated by the compressor 1 and generates high-temperature combustion gas. The turbine 3 is rotated by the combustion gas generated by the combustor 2. The power generator 4 is driven by the rotation of the turbine 3 and generates power. A rotor 5 of the turbine 3 is connected to a rotor of the power generator 4 via a coupling shaft 6 and is connected to a rotor of the compressor 1 via an intermediate shaft 7.

The turbine 3 is provided with the rotor 5 and rotary blades 8a, 8b, 8c, and 8d in a plurality of arrays provided on an outer circumferential side of the rotor 5. Also, the turbine 3 is provided with a casing 9 that incorporates the rotor 5 and the rotary blades 8a, 8b, 8c, and 8d and stator blades 10a, 10b, 10c, and 10d in a plurality of arrays provided on an inner circumferential side of the casing 9. The stator blades or the rotor blades in each array are configured of a plurality of stator blades or rotor blades aligned in a circumferential direction of the turbine 3. The stator blades and the rotor blades in each array are alternately arranged in an axial direction (the horizontal direction in FIG. 2) of the turbine 3. Then, the high-temperature combustion gas generated by the combustor 2 expands while alternately passing through the stator blades in each array and the rotor blades in each array, and rotates the rotor 5.

Figure 3:
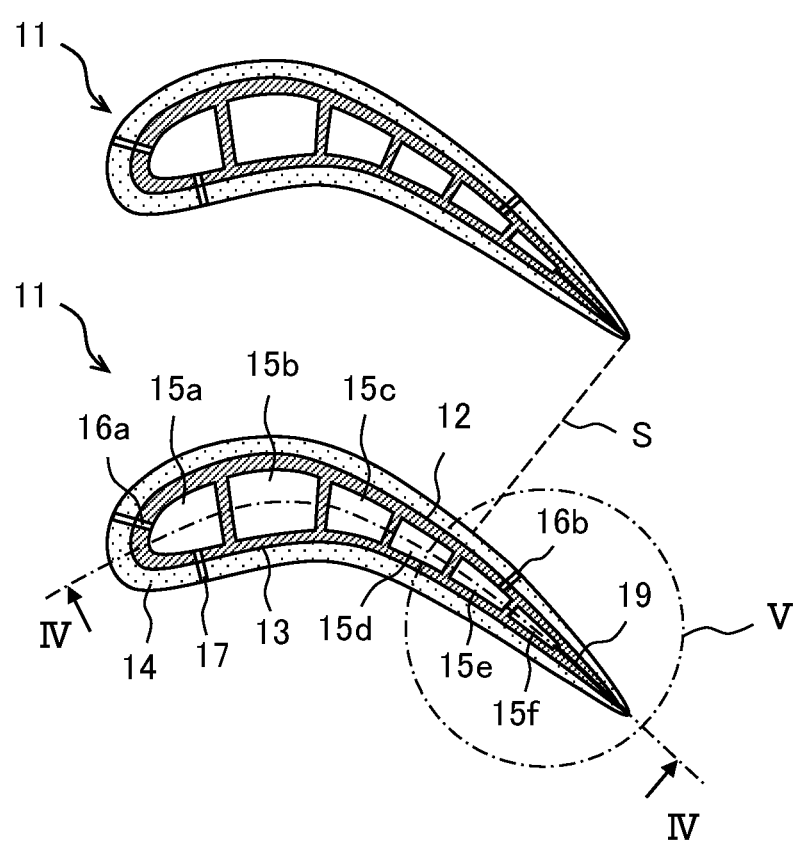
FIG. 3 is a cross-sectional view illustrating a structure of a turbine blade according to a first embodiment of the invention along with a passage between turbine blades.
Figure 4:
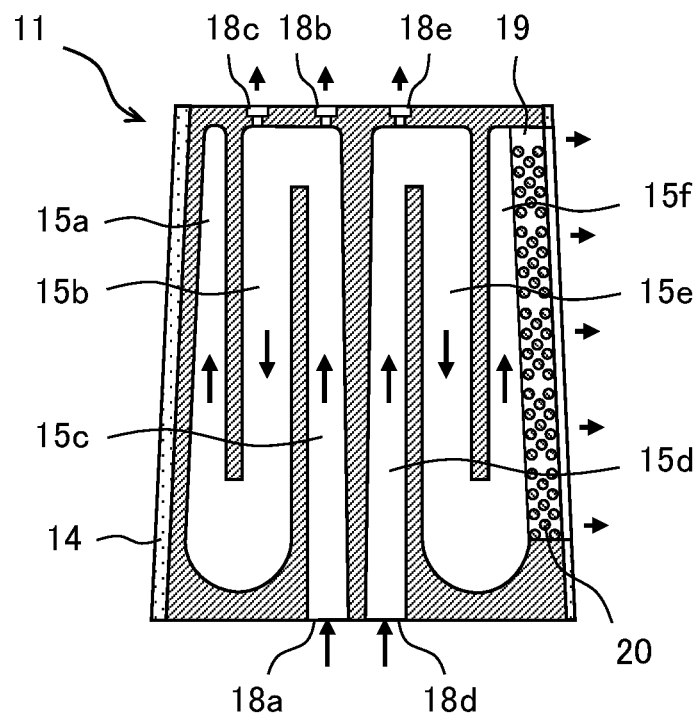
FIG. 4 is a longitudinal sectional view taken along the line IV-IV in FIG. 3.
Figure 5:
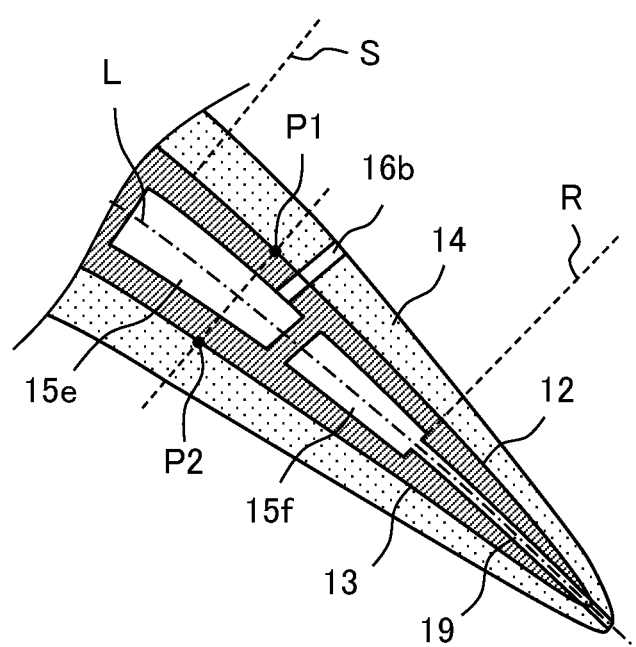
FIG. 5 is a partially enlarged cross-sectional view of the portion V in FIG. 3.

FIG. 3 is a cross-sectional view illustrating a structure of a turbine blade (that is, the aforementioned rotor blades or the stator blades of the turbine 3) according to the first embodiment of the invention along with a passage between the turbine blades (in other words, a sectional view in a circumferential direction of the turbine). FIG. 4 is a longitudinal sectional view taken along the line IV-IV in FIG. 3 (in other words, a section taken along a camber line). FIG. 5 is a partial enlarged cross-sectional view of the part V in FIG. 3.

A blade surface 12 on a suction side and a blade surface 13 on a pressure side of the turbine blade 11 are covered with thermal barrier coating 14 (specifically, coating with lower heat conductivity than that of the blade material). In doing so, the blade surfaces 12 and 13 (that is, the surface of the blade material) is thermally shield from high-temperature mainstream gas.

A plurality of cooling passages 15a to 15f extending in a blade height direction (the vertical direction in FIG. 4) are formed inside the turbine blade 11. Film cooling holes 16a and 16b in two arrays, for example, are formed in the blade surface 12 and the thermal barrier coating 14 on the suction side and film cooling holes 17 in one array, for example, are formed in the blade surface 13 and the thermal barrier coating 14 on the pressure side. The film cooling holes in the respective arrays are configured of a plurality of film cooling holes aligned in the blade height direction.

The cooling passages 15a, 15b, and 15c are arranged on a blade leading edge side (the left side in FIGS. 3 and 4) and communicate with each other on a blade root side (the lower side in FIG. 4) and a blade tip side (the upper side in FIG. 4) to form a passage in a serpentine shape. The cooling passage 15c communicates with an opening 18a on the blade root side and an opening 18b on the blade tip side, the cooling passage 15b communicates with an opening 18c on the blade tip side, and the cooling passage 15a communicates with the film cooling holes 16a and 17. Then, air extracted from an intermediate stage of the compressor 1 (see FIG. 1) flows as cooling air (specifically, air at a lower temperature than that of the mainstream gas) from the opening 18a to the inside of the blade and then flows through the cooling passage 15c. A part of the cooling air that has flowed through the cooling passage 15c is discharged from the openings 18b and 18c to the outside of the blade, and a remaining part of the cooling air flows to the cooling passages 15b and 15a. The cooling air that has flowed through the cooling passage 15a is discharged from the film cooling holes 16a and 17 to the outside of the blade.

The cooling passages 15d, 15e, and 15f are arranged on a blade trailing edge side (the right side in FIGS. 3 and 4) communicate with each other on the blade root side and the blade tip side to form a passage in the serpentine shape. The cooling passage 15d communicates an opening 18d on the blade root side and an opening 18e on the blade tip side, the cooling passage 15e communicates the film cooling hole 16b, and the cooling passage 15f communicates with a trailing edge discharge passage 19. Then, air extracted from the intermediate stage of the compressor 1 flows as cooling air from the opening 18d to the inside of the blade and then flows through the cooling passage 15d. A part of the cooling air that has flowed through the cooling passage 15d is discharged from the opening 18e to the outside of the blade, and a remaining part of the cooling air flows to the cooling passage 15e. A part of the cooling air that has flowed through the cooling passage 15e is discharged from the film cooling hole 16b, and a remaining part of the cooling air flows to the cooling passage 15f. The cooling air that has flowed through the cooling passage 15f is discharged from the trailing edge discharge passage (discharge hole) 19 to the outside of the blade. The trailing edge discharge passage 19 is provided with a plurality of pins 20 extending between the suction side and the pressure side.

As described above, the cooling air flowing through the cooling passages 15a to 15f as described above cools the inside of the blade surfaces 12 and 13. The cooling air ejected from the film cooling holes 16a, 16b, and 17 flowing along the surface of the thermal barrier coating 14 cools the thermal barrier coating 14 (in other words, the outside of the blade surfaces 12 and 13).

Here, description will be given of thickness distribution of the thermal barrier coating 14 as a feature of the embodiment. A design point P1 on the suction side is set on the blade surface 12 on the suction side in each blade section perpendicular to the blade height direction of the turbine blade 11 within a range from a position on a back side (trailing edge side) of and including a throat position S, at which the distance between the turbine blades 11 is the global minimum, and to a position in front of (leading edge side) and not including a position R of the tailing end of the final cooling passage 15f that is the closest to the blade trailing edge in the cooling passages 15a to 15f. In addition, the thickness distribution of the thermal barrier coating 14 on the suction side of each blade section is configured such that the thickness of the thermal barrier coating 14 is uniform at a predetermined value ha from the blade leading edge to the design point P1 and gradually reduces to a predetermined value hb (where hb<ha) from the design point P1 toward the back side up to the blade trailing edge.

In addition, a design point P2 on the pressure side is set so as to be symmetric with the design point P1 on the suction side with respect to a camber line L (the center line of the blade shape) as an axis of symmetry on the blade surface 13 on the pressure side in each blade section perpendicular to the blade height direction of the turbine blade 11. The thickness distribution of the thermal barrier coating 14 on the pressure side of each blade section is configured such that the thickness of the thermal barrier coating 14 is uniform at the predetermined value ha from the blade leading edge to the design point P2 and gradually reduces to the predetermined value hb from the design point P2 toward the back side up to the blade trailing edge.

According to the embodiment, the film cooling hole 16b in the final array that is the closest to the blade trailing edge from among the film cooling holes 16a and 16b in two arrays on the suction side are present within a range from a position on the back side of and including the throat position S, and to a position in front side of and not including the position R of the tailing end of the final cooling passage 15f. In addition, the design point P1 on the suction side is set within a range on the back side of the throat position S, including the position S, and on the front side beyond and not including the position of the film cooling hole 16b in the final array on the blade surface 12 on the suction side of each blade section.

Next, description will be given of effects and advantages of the embodiment.

Figure 6:
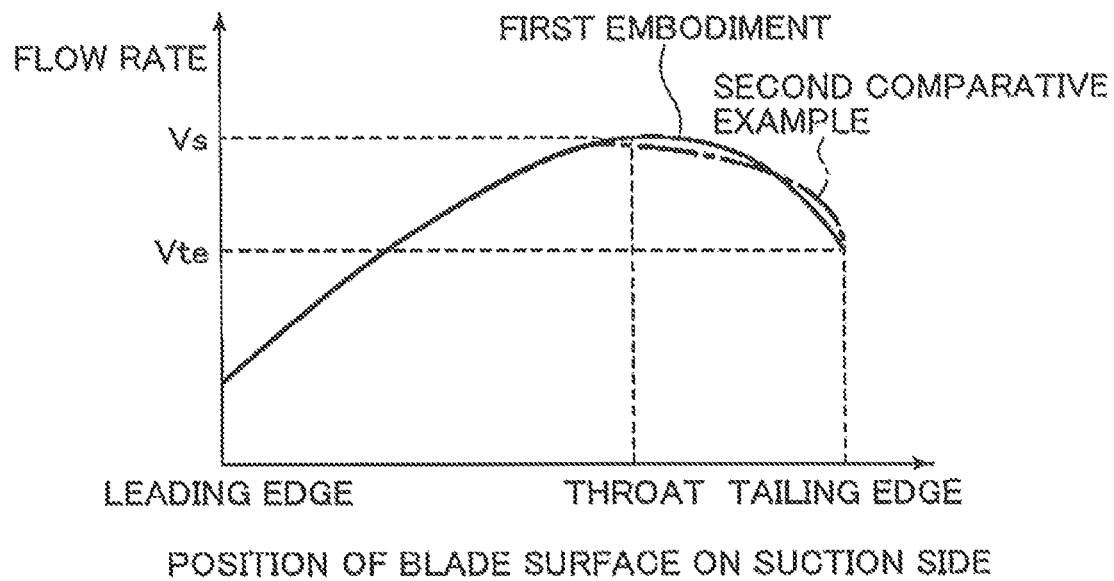
FIG. 6 is a diagram illustrating velocity distribution of fluid flowing along thermal barrier coating on a suction side of the turbine blade according to the first embodiment of the invention and a comparative example.

Elements of aerodynamic performances of the turbine blade 11 include a boundary layer on the surface of the thermal barrier coating 14 on the suction side and wake (velocity defect region) on a downstream side of the blade trailing edge. A state of the boundary layer on the surface of the thermal barrier coating 14 on the suction side depends on velocity distribution on the surface of the thermal barrier coating 14 on the suction side. On the blade suction side, distribution in which the velocity increases from the blade leading edge to the throat and decreases from the throat to the blade trailing edge is observed (see FIG. 6). The boundary layer grows in a deceleration region from the throat to the blade trailing edge. As an index for evaluating the deceleration region on the blade suction side, there is a diffusion factor DF. The diffusion factor DF can be represented by using a flow rate Vs at the throat and a flow rate Vte at the blade trailing edge as represented by the following Equation (1). If the diffusion factor DF is small, the amount of deceleration from the throat to the blade trailing edge is small, and the growth of the boundary layer is suppressed.

$$DF=(Vs-Vte)/Vte \tag{1}$$

The width of the wake on the downstream side of the blade trailing edge depends on the blade trailing edge width (specifically, the width between the surface of the thermal barrier coating 14 on the suction side and the surface of the thermal barrier coating 14 on the pressure side) and a nip angle of the blade trailing edge (specifically, a nip angle between the surface of the thermal barrier coating 14 on the suction side and the surface of the thermal barrier coating 14 on the pressure side). If the blade trailing edge width decreases, the width of the wake decreases in a substantially proportional manner. If the nip angle of the blade trailing edge increases, a peeling point on the surface of the thermal barrier coating 14 shifts toward the downstream side, and the width of the wake thus decreases.

Here, a case is assumed in which the thickness distribution of the thermal barrier coating on the suction side of each blade section is configured such that the thickness of the thermal barrier coating is uniform at the predetermined value ha from the blade leading edge to the blade trailing edge and the thickness distribution of the thermal barrier coating on the pressure side of each blade section is configured such that the thickness of the thermal barrier coating is uniform at the predetermined value ha from the blade leading edge to the blade trailing edge as a first comparative example.

According to the embodiment, the gradual decrease in the thickness of the thermal barrier coating 14 on the suction side leads a large curvature of the entire deceleration region (that is, from the throat to the blade trailing edge) on the blade suction side, and the flow rate Vte at the blade trailing edge increases as compared with the first comparative example. In doing so, the diffusion factor DF decreases, and the growth of the boundary layer can be suppressed. Since the blade trailing edge width decreases, and the nip angle of the blade trailing edge increases as compared with the first comparative example, it is possible to reduce the width of the wake. Therefore, it is possible to suppress a loss of aerodynamic force and to thereby improve the aerodynamic performances.

The same case as that in JP-A-2013-194667 is assumed as a second comparative example. That is, the design point on the suction side is set at a position of the tailing end of the final cooling passage 15f on the blade surface 12 on the suction side in each blade section. In addition, the thickness distribution of the thermal barrier coating on the suction side of each blade section is configured such that the thickness of the thermal barrier coating is uniform at the predetermined value ha from the blade leading edge to the design point on the suction side and gradually reduces to the predetermined value hb from the design point on the suction side toward the back side up to the blade trailing edge. In addition, the design point on the pressure side is set at the position of the tailing end of the final cooling passage 15f on the blade surface 13 on the pressure side in each blade section. The thickness distribution of the thermal barrier coating on the pressure side of each blade section is configured such that the thickness of the thermal barrier coating is uniform at the predetermined value ha from the blade leading edge to the design point on the pressure side and gradually reduces to the predetermined value hb from the design point on the pressure side toward the back side up to the blade trailing edge.

In the second comparative example, the region where the thickness of the thermal barrier coating on the suction side gradually reduces is relatively small. Therefore, deceleration gradient of fluid flowing along the thermal barrier coating on the suction side locally increases as illustrated by the one-dotted chain line in FIG. 6, and the boundary layer tends to grow. In contrast, the design point P1 on the suction side is set on a further forward side and the region where the thickness of the thermal barrier coating 14 on the suction side gradually reduces is enlarged in the embodiment as compared with the second comparative example. In doing so, it is possible to alleviate the deceleration gradient of the fluid passing through the throat between the turbine blades 11 and flowing along the thermal barrier coating 14 on the suction side as represented by the solid line in FIG. 6 and to suppress the growth of the boundary layer. Therefore, it is possible to suppress the loss of the aerodynamic power.

According to the embodiment, the blade trailing edge width slightly decreases while the nip angle of the blade trailing edge slightly decreases as compared with the second embodiment. Therefore, the effects related to the width of the wake are not significantly different from those in the second comparative example. Therefore, it is possible to suppress the growth of the boundary layer and to suppress the loss of the aerodynamic force as described above, and thereby to improve the aerodynamic performances.

Description will be given of a second embodiment of the invention with reference to FIG. 7. In the embodiment, the same reference numerals will be given to the same parts as those in the first embodiment, and description thereof will be appropriately omitted.

Figure 7:
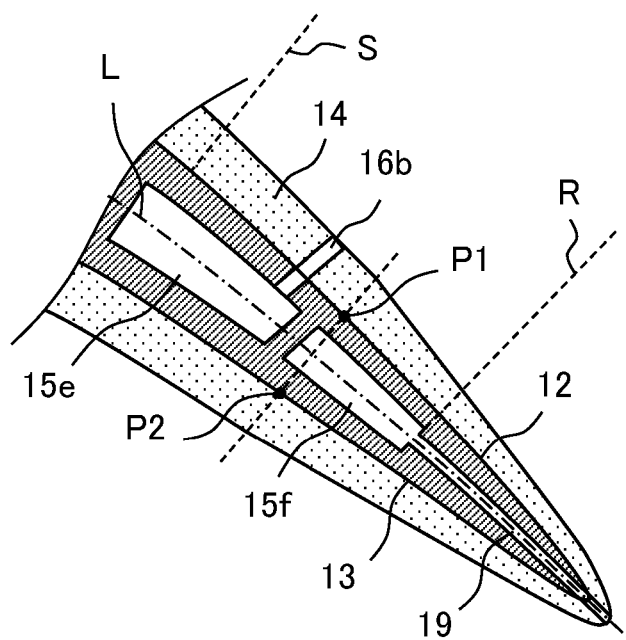
FIG. 7 is a partially enlarged cross-sectional view illustrating a structure of a turbine blade according to a second embodiment of the invention.

FIG. 7 is a partially enlarged cross-sectional view illustrating a structure of a turbine blade according to the embodiment, and corresponds to FIG. 5 in the first embodiment.

According to the embodiment, the design point P1 on the suction side is set within a range on the back of the position of the film cooling hole 16b in the final array on the suction side, including the position, and on the front side beyond and not including the position R of the tailing end of the final cooling passage 15f on the blade surface 12 on the suction side in each blade section perpendicular to the blade height direction of the turbine blade 11. The thickness distribution of the thermal barrier coating 14 on the suction side of each blade section is configured such that the thickness of the thermal barrier coating 14 is uniform at the predetermined value ha from the blade leading edge to the design point P1 and gradually reduces to the predetermined value hb from the design point P1 toward the back side up to the blade trailing edge.

The design point P2 is set so as to be symmetric with the design point P1 on the suction side with respect to the camber line L as an axis of symmetry on the blade surface 13 on the pressure side in each blade section perpendicular to the blade height direction of the turbine blade 11. In addition, the thickness distribution of the thermal barrier coating 14 on the pressure side of each blade section is configured such that the thickness of the thermal barrier coating 14 is uniform at the predetermined value ha from the blade leading edge to the design point P2 and gradually reduces to the predetermined value hb from the design point P2 toward the back side up to the blade trailing edge.

According to such an embodiment, the design point P1 on the suction side is set on a further forward side, and the region where the thickness of the thermal barrier coating 14 on the suction side gradually reduces is enlarged as compared with the aforementioned second comparative example. In doing so, it is possible to alleviate the deceleration gradient of the fluid passing through the throat between the turbine blades 11 and flowing along the thermal barrier coating 14 on the suction side and to suppress the growth of the boundary layer. Therefore, it is possible to suppress the loss of the aerodynamic force and to improve the aerodynamic performances.

Since the design point P1 is set on the back side of the film cooling hole 16b in the final array in the embodiment, the curvature from the film cooling hole 16b to the blade trailing edge increases and the cooling air velocity increases on the downstream side of the film cooling hole 16b as compared with the first embodiment. In doing so, the cooling air ejected from the film cooling hole 16b flows while being brought into contact with the surface of the thermal barrier coating 14, and the cooling effect can be improved.

Although the case where the turbine blade 11 included the film cooling holes 16a and 16b in two arrays on the suction side was exemplified in the second embodiment, the invention is not limited thereto, and it is only necessary for the turbine blade 11 to have film cooling holes in at least one array. That is, it is only necessary for the film cooling holes in the final array, which are the closest to the blade trailing edge from among the film cooling holes in at least one array on the suction side, to be present within the range from the position on the back side of and including the throat position S, and to the position in front of and not including the position R of the tailing end of the final cooling passage 15f.

Although the case where the turbine blade 11 included five cooling passages formed inside the blade and extending in the blade height direction was exemplified in the first and second embodiments, the invention is not limited thereto, and it is only necessary for the turbine blade 11 to include at least one cooling passage. That is, it is only necessary for the tailing end of the final cooling passage, which is the closest to the blade trailing edge in the at least one cooling passage, to be positioned on the back side beyond and not including the throat position S.

Figure 8:
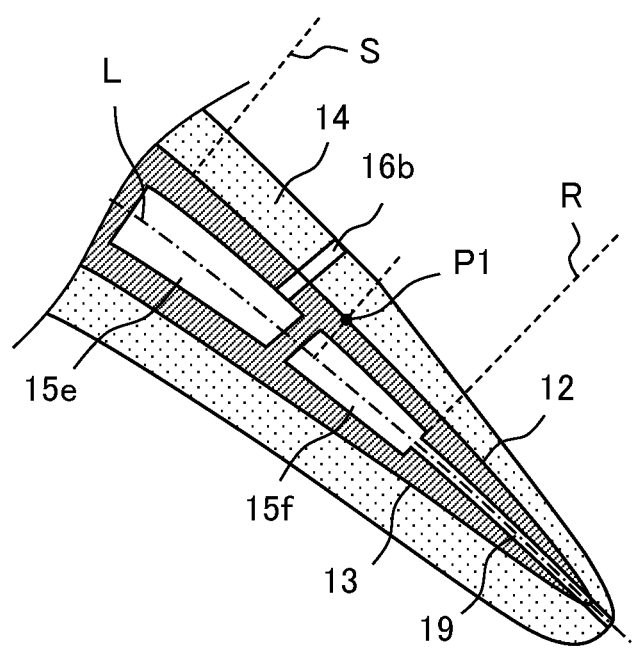
FIG. 8 is a partially enlarged cross-sectional view illustrating a structure of a turbine blade according to a modification example of the invention.

Although the case where the thickness distribution of the thermal barrier coating 14 on the pressure side of each blade section was configured such that the thickness of the thermal barrier coating 14 was uniform from the blade leading edge to the design point P2 on the pressure side and gradually reduced from the design point P2 toward the back side up to the blade trailing edge was exemplified in the first and second embodiments, the invention is not limited thereto, and modification can be made without departing from the gist and the technical idea of the invention. That is, the thickness distribution of the thermal barrier coating 14 on the suction side and on the pressure side may be differentiated by paying attention to a difference in flow on the suction side and the pressure side (in other words, a difference in thermal environments). Specifically, the thickness distribution of the thermal barrier coating 14 on the pressure side of each blade section may be configured such that the thickness of the thermal barrier coating 14 is uniform from the blade leading edge to the blade trailing edge as illustrated in FIG. 8, for example. In doing so, the thermal barrier effect of the blade surface 13 on the pressure side may be enhanced as compared with that of the blade surface 12 on the suction side.

What is claimed is:

1. A turbine blade comprising:
at least one cooling passage that is formed in the blade and extends in a blade height direction, wherein the at least one cooling passage comprises a final cooling passage that is closest to a blade trailing edge, and the final cooling passage communicates with a trailing edge discharge passage which is adapted to discharge air that has flowed through the final cooling passage, wherein blade surfaces on a suction side and a pressure side are covered with thermal barrier coating, wherein a design point on the suction side is set on the blade surface on the suction side in each blade section perpendicular to the blade height direction within a range from a position on a back side of and including a throat position, at which a distance between turbine blades is a global minimum, to a position in front of and not including a position of a tailing end of the final cooling passage, and wherein thickness distribution of the thermal barrier coating on the suction side of each blade section is configured such that a thickness of the thermal barrier coating is uniform from a blade leading edge to the design point and gradually reduces from the design point toward the back side up to the blade trailing edge.

2. The turbine blade according to claim 1, further comprising:

at least one array of film cooling holes on the suction side, which are formed in the blade surface and the thermal barrier coating on the suction side and communicate with the cooling passage, wherein film cooling holes on the suction side in a final array that is the closest to the blade trailing edge among the at least one array of film cooling holes on the suction side are present within the range from a position on the back side of and including the throat position, and to a position in front of and not including the position of the tailing end of the final cooling passage, and wherein the design point is set within a range from a position on the back side of and including the position of the film cooling holes on the suction side in the final array, and to a position in front of and not including the position of the tailing end of the final cooling passage on the blade surface on the suction side in each blade section.

3. The turbine blade according to claim 1, wherein a design point on the pressure side is set so as to be symmetric with the design point on the suction side with respect to a camber line as an axis of symmetry on the blade surface on the pressure side in each blade section, and wherein thickness distribution of the thermal barrier coating on the pressure side of each blade section is configured such that a thickness of the thermal barrier coating is uniform from the blade leading edge to the design point on the pressure side and gradually reduces from the design point on the pressure side toward the back side up to the blade trailing edge.

4. The turbine blade according to claim 1, wherein thickness distribution of the thermal barrier coating on the pressure side of each blade section is configured such that a thickness of the thermal barrier coating is uniform from the blade leading edge to the blade trailing edge.

* * * * *